United States Patent [19]

Knavish et al.

[11] Patent Number: 5,006,144
[45] Date of Patent: Apr. 9, 1991

[54] MELTING GLASS WITH OXIDATION CONTROL AND LOWERED EMISSIONS

[75] Inventors: Leonard A. Knavish, Plum Boro; William C. Harrell, Sarver, both of Pa.

[73] Assignee: PPG Industries, Inc., Pittsburgh, Pa.

[21] Appl. No.: 543,006

[22] Filed: Jun. 25, 1990

[51] Int. Cl.$^5$ ............................ C03C 3/087; C03B 5/04
[52] U.S. Cl. ............................................ 65/134; 65/135
[58] Field of Search ............................... 65/27, 134-136

[56] References Cited

U.S. PATENT DOCUMENTS 4,634,461  1/1987  Demarest et al. ........................ 65/27
4,919,698  4/1990  Knavish ................................. 65/134

Primary Examiner—Robert L. Lindsay
Attorney, Agent, or Firm—Dennis G. Millman

[57] ABSTRACT

Premature dissociation of fining agent is avoided in a glass melting operation while controlling the final redox state of the product glass by initiating the melting process under relatively oxidizing conditions and subsequently altering the redox conditions to make the glass more reducing. A glass that is more reduced than usual can thereby be produced without sacrificing the ability to adequately fine the glass. For a given redox level, less fining agent need be used, thereby lowering emissions from the melting operation, because dissociation of the fining agent is delayed until a later stage of the process where the redox conditions are changed.

26 Claims, 1 Drawing Sheet

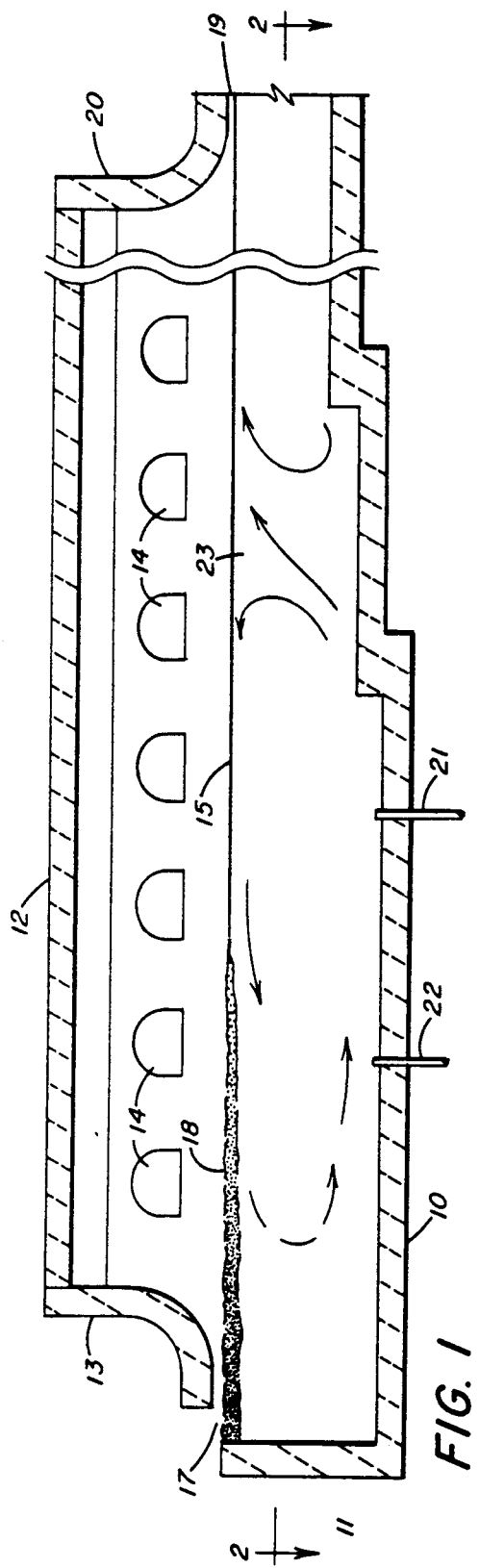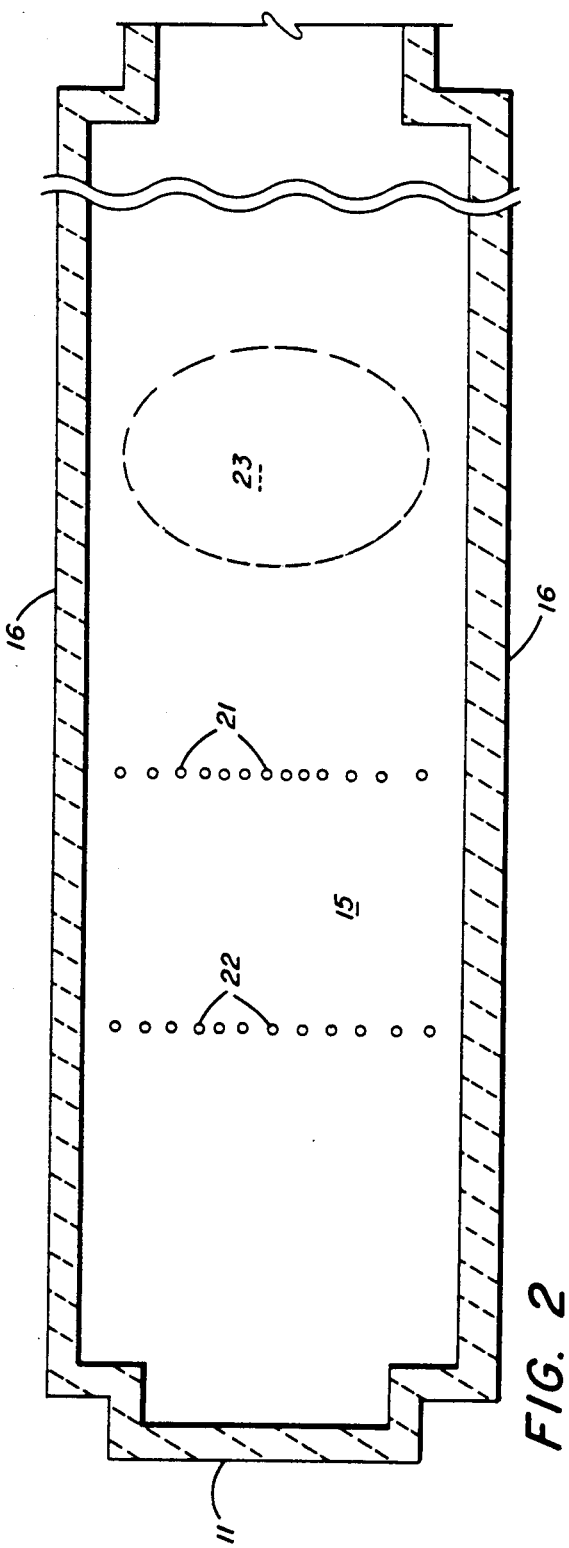
FIG. 1
FIG. 2

MELTING GLASS WITH OXIDATION CONTROL AND LOWERED EMISSIONS

BACKGROUND OF THE INVENTION

This invention involves the interrelationship between the redox condition of melting glass and the solubility of certain compounds in the melt. More specifically, this invention deals with controlling this interrelationship so as to reduce emissions from the glass melting operation, to assure adequate fining of the glass, or to produce certain colored glasses.

Commercial production of glass conventionally involves feeding raw glass batch materials into an opening at one end of an elongated melting furnace while withdrawing melted glass through an opening at the opposite end of the furnace. When exposed to the high temperature conditions within the melting furnace, the raw materials undergo chemical reactions and dissolution which normally take place within the first portion of a continuous glass melting furnace. The remainder of the furnace is devoted to "fining" (or "refining") and conditioning the glass melt. The process of fining is the removal of gaseous products of reaction or other entrained gases from the melt by providing conditions which cause the gases to be driven from the molten glass. High temperature is one of the conditions that enhances fining, and for that reason the heat sources in a melting furnace are often arranged to provide the peak temperature downstream from the initial melting zone. Failure of the glass to be adequately fined can result in the undesirable presence of bubbles or "seeds" in the product glass.

Glass makers conventionally include in the mixture of batch materials being fed to a melting furnace at least one compound that is intended to serve as a fining aid or agent. A fining agent is characterized by its tendency to dissociate at relatively high temperatures, whereby it dissociates and forms substantial volumes of gas into which undesired species of gas diffuse and thereby more readily escape from the melt. Compounds of sulfur constitute the most common refining agents, particularly sodium sulfate (salt cake) and calcium sulfate (gypsum). Other sulfates, as well as sulfides and sulfites have also been suggested as fining agents. Injecting $SO_2$ gas directly into the melting glass is proposed in U.S. Pat. No. 3,375,095 (Poole). Regardless of the form in which the sulfur is introduced into the melt, most of the sulfur is converted to sulfate, sometimes expressed equivalently as $SO_3$ concentration, in which form a portion remains dissolved in the glass and the remainder dissociates, forming $SO_2$ and $O_2$. Carbonaceous material, usually powdered coal, is sometimes included in the batch mixture so as to increase the amount of sulfur that dissociates from the melting glass with the intention of enhancing the fining effect.

Ideally, the fining agent would dissociate when it is desired to begin the fining process, i.e., after the initial melting of the batch materials, as the melt enters the zone of peak temperature. Unfortunately, fining agents often begin dissociating as soon as they are exposed to the heat of the furnace and the reducing conditions produced by the presence of reducing agents such as carbon that are included in the batch mixtures. As a result, there is premature dissociation of the refining agent before the glass enters the fining zone. In order to provide sufficient fining agent for the downstream fining process, it has then been necessary to include excess fining agent in the batch mixture to compensate for the losses in the early melting stages. As a result, considerably more of products of the dissociation of the fining agent enter the exhaust gas stream from the furnace than is required for the fining process itself. The emissions from most fining agents are considered to be environmentally detrimental, and costly exhaust gas treatment is often required to avoid excessive discharge of these emissions to the atmosphere. Accordingly, it would be desirable to reduce the amount of refining agent required One approach to reducing the amounts of fining agent used is disclosed in U.S. Pat. No. 4,138,235 (Turner), but further reductions would be desirable.

Some colored glasses require that the reduction/oxidation ("redox") state of the melt be controlled so as to be relatively reducing so that certain multivalent colorant ions are induced to be present in the glass in their lower valence state. Iron is frequently used as a colorant in glass, and it is known that melting the glass under reducing conditions enhances the amount of the iron that is in the ferrous state rather than the ferric state, with the result that the glass is more absorbing in the infrared range of the spectrum. This is very desirable for glass that is intended to reduce the heat gain into enclosures such as buildings or automobiles. One prior art attempt to increase the infrared absorption of glass by increasing the amount of ferrous iron entailed including larger total amounts of iron in the glass. This approach is limited by the difficulty of melting glass with large amounts of iron due to lowered heat transfer. Using a moderate amount of iron and attempting to drive more of it to the ferrous state by providing a reducing environment in the melter by including a reducing agent (such as powdered coal or other carbon source) in the batch materials or by firing the furnace with an excess of fuel has also been less than successful because of inadequate fining. Production of relatively reduced glass by introduction of reductant with the batch mixture can lead to premature dissociation of the fining agents so that amounts remain at the fining zone, with the consequence that fining may be inadequate. Specialized melting and fining means as disclosed in U.S. Pat. No. 4,792,536 (Pecoraro and Shelestak) can avoid these problems, but it would be desirable to be able to produce reduced glasses with the large capacity of conventional glass melting furnaces presently available.

U.S. Pat. No. 2,330,324 (Adams) discloses a process of first bubbling carbon monoxide (a reducing agent) through a pot of glass and then bubbling oxygen, the combined effect of which is said to improve fining of the glass and to produce clear glass. That patent also describes the former practice of throwing carbonaceous objects such as potatoes or blocks of wood into a glass melt to temporarily increase the local fining action. Such an erratic technique is not considered suitable for a large scale, continuous glass melting operation.

U.S. Pat. No. 2,387,222 (Wright) discloses bubbling gas into molten glass in a melting and fining furnace for the purpose of controlling the circulation of glass in the furnace. It is disclosed that the gas may be oxidizing, reducing, or neutral. The purpose for using a reducing gas is stated to be "to retain certain colorants." There is no disclosure of which colorants are contemplated nor of an explanation as to how a colorant would be retained by making the glass more reducing.

U.S. Pat. No. 2,254,079 (McAlpine) proposes assisting the fining process by bubbling gases through molten glass in a fining zone of reduced depth. Carbon monoxide is one of the gases suggested as being usable in this process, although a troublesome brown coloration is described as requiring subsequent treatment with oxygen.

SUMMARY OF THE INVENTION

In accordance with the present invention, the necessity of having to choose between having reducing conditions or providing adequate fining is avoided. Melting of glass is initiated under conditions that are sufficiently oxidizing to yield adequate solubility of sulfate in the melt. Subsequently, redox conditions are altered to a more reducing condition during the completion of the melting process. One consequence of the shift toward a more reducing condition is that solubility of sulfate in the melt is decreased, causing dissociation of the sulfate that is in excess of the solubility limit. By effecting this redox change in the vicinity of the fining zone, the fining is assisted by the additional gaseous release of the excess sulfur compounds. As a result, the fining can be more effective for a given amount of sulfur fining agent, or a given level of fining performance can be achieved with less sulfur refining agent in the batch mixture. In the latter case, the batch mixture need be provided with little or no sulfur in excess of the solubility limit of the melt in the early melting stages, the gaseous release in the subsequent fining zone being provided substantially by the redox change. As a result, dissociation of sulfate in excess of the solubility limit is substantially lessened at the initial melting stage so that emissions are decreased, but at the same time adequate fining action is assured.

The magnitude of the redox change will vary, depending upon the particular melting conditions, the particular glass composition, and the redox state desired in the final glass for the multivalent ions. The operative step of increasing the redox ratio in the present invention will generally be on the order of a twenty percent increase or more as measured by the ratio of iron in the ferrous state (expressed as FeO) to total iron (expressed as $Fe_2O_3$). It should be understood that iron oxide need not actually be present and that the redox state can be measured equivalently in terms of other multivalent species.

Eliminating some of the dissolved sulfate from the glass by changing the redox conditions in the melting furnace also has advantages for subsequent steps of the glass making process. In the manufacture of flat glass by the float process, the melted and fined molten glass is directed onto a pool of molten tin in a float forming chamber and is shaped into a thin, flat ribbon of glass as it passes along the pool of tin. Sulfur introduced into the float forming chamber from the molten glass has the undesirable effect of reacting with the tin to form tin sulfide, which volatilizes and condenses on the roof of the chamber, and various products of this condensation may subsequently drip onto the glass ribbon, thereby causing defects in the glass. By lowering the amount of sulfur present in the glass, formation of tin sulfide in the float forming chamber may be lessened and the drip problem alleviated.

Shifting redox conditions within the melting and fining process also has advantages for making glass colored with a multivalent ion such as iron. Instead of providing the batch mixture with a reducing agent to induce formation of the lower valence state of the colorant ions, the batch may be initially melted under relatively oxidizing conditions that provide greater solubility of sulfur-containing fining agents. Then the desired lower valence state can be induced by changing the redox conditions downstream from the initial melting stage. Accordingly, infra-red absorbing glass having a high proportion of iron in the ferrous state can be melted and adequately fined in a conventional tank-type melting furnace.

Selenium is another colorant whose solubility in molten glass is known to increase as the redox condition is more oxidizing. But some uses of selenium as a colorant require it to be reduced, which entails low solubility. Selenium is very volatile at glass melting temperatures and is relatively costly. Therefore, improved retention of selenium in the glass by means of the redox variation technique of the present invention can be very useful.

The relatively oxidizing condition maintained during the initial melting stage of the present invention may be provided by appropriate selection of the batch mixture (e.g., substantial absence of reducing agents). The subsequent shift to more reducing conditions is carried out by substantially continuously introducing reductant into the melt at a location within or preferably slightly upstream from the fining zone. In most cases the beginning of the fining zone is the region of maximum glass temperature, or "spring zone." The reductant may be injected in the form of a gas, such as a fuel gas, or it may be produced electrolytically within the melt.

THE DRAWINGS

FIG. 1 is a vertical cross-section through a typical cross-fired, end-fed, glass melting furnace showing circulation flow patterns of the molten glass and the locations of electrodes in accordance with one embodiment of the invention.

FIG. 2 is a plan view of the lower portion of the furnace of FIG. 1 showing an example of an arrangement of electrodes in accordance with the invention.

DETAILED DESCRIPTION

A typical glass melting furnace to which the present invention relates may be characterized by an inlet end at which raw glass batch materials are deposited onto a pool of molten glass held in the furnace and a generally opposite outlet end from which a product stream of molten glass is withdrawn from the pool. A specific embodiment of the invention is described herein in the context of a common type of glass melting furnace in which the primary source of heat for melting is a plurality of flames extending transversely above the molten glass pool from ports in the side walls. It should be understood that other configurations of glass melting furnace are also commonly used and may also benefit from the present invention.

Referring to FIG. 1, the typical glass melting furnace depicted includes a refractory basin bottom wall 10, basin inlet end wall 11, an arched roof 12, a suspended back wall 13, and a plurality of side firing ports 14. The number of ports may vary; typical flat glass furnaces usually have five to eight ports on each side. The basin of the furnace contains a pool of melting glass 15. Side basin walls 16 are shown in FIG. 2. Batch materials are fed onto the pool 15 through an inlet opening 17 and form a layer or batch cover 18 that melts as it progresses into the furnace. Molten glass passes from the furnace through an outlet opening 19 at an exit end of the furnace partly defined by an exit end wall 20.

The circulation currents in the pool of molten glass 15 are shown in FIG. 1. The presence of relatively cold batch material at the inlet end of the furnace and the shielding of the pool of glass from the overhead flames by the layer of batch 18 cause downward convection currents in the inlet region of the pool. The hottest region in the molten glass tends to be located downstream from the end of the batch layer 18, typically opposite the last or next-to-last port 14. The high temperatures in this region 23 known as the "spring zone" or "hot spot" generate rising convection currents in the pool. The combination of the rising and descending convection currents produces a circulation cell in the region upstream from the spring zone 23 which, as viewed in FIG. 1, moves in a generally counter-clockwise direction, with flow in the upper portion moving in an upstream direction (i.e., toward the inlet 17) and with flow in the bottom portion moving in the downstream direction. Downstream from the spring zone a circulation cell rotating in the opposite direction may be present.

One technique for carrying out the redox change within the melting furnace in accordance with the present invention is to inject a reducing gas into the melt. A plurality of bubbler tubes 21 which may, for example, extend through the bottom 10 of the furnace may be provided for this purpose. The bubblers 21 are shown in a straight row extending substantially across the width of the furnace in the drawings, but it should be understood that more than one row may be used and that a linear arrangement is not necessary. The number and spacing of the bubblers 21 is dependent upon the degree to which the injected reducing gas is to be dispersed in the melt. The need to introduce the gas in a dispersed manner depends upon the extent to which the normal operation of the furnace homogenizes the melt. If strong convection currents are maintained in the furnace, only a few widely spaced bubblers may be necessary. Otherwise, a larger number of bubblers is needed so that regions of reduced and unreduced glass do not persist in the furnace downstream from the spring zone 23. Theoretically, the number of bubblers would preferably be as large as possible, but is limited by the inconvenience and cost of installation.

The reducing gases used with the present invention are preferably carbon-containing substances, most conveniently hydrocarbon fuels such as methane or propane. Carbon monoxide could also be used. It should be understood that the description of the reducing agent as being a gas refers to its state at furnace operating conditions and that it need not be gaseous at standard conditions. Thus, liquid substances such as fuel oil may also be used. Theoretically, the reductant could even be a solid such as coal if a suitable mechanism is provided for introducing it below the surface of the molten glass. The reducing gas is injected into the molten glass as opposed to the space above the molten glass so that a substantial, localized redox change is effected.

It should be understood that creation of bubbles of reducing gas in the molten glass is not necessary. In fact, it may be preferred to diffuse the reducing gases as much as possible. Thus, an alternative mode of introducing the reducing gas into the melt is to pass the gas through a porous refractory member submerged in the melt or forming part of the furnace bottom.

Another alternative to injecting reducing gas into the molten glass is to change the redox conditions electrolytically. For this embodiment of the present invention the elements 21 and 22 in the drawings represent electrodes connected to a source of direct current. The electrodes 21 are cathodes and the electrodes 22 are anodes. Sacrificial iron electrodes are preferred for this purpose. At the cathode, sodium ions in the glass are reduced to elemental sodium which in turn gives rise to the following or equivalent reactions:

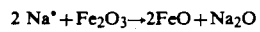

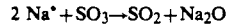

At the anode oxygen bubbles will be generated, which is beneficial for maintaining the desired oxidizing conditions at the initial melting stage. Therefore, the anodes 22 are preferably located upstream from the cathodes 21 and may be located under the batch layer 18, although their particular location and number are not critical for the purposes of the present invention. A single anode would suffice, but it is preferred to provide a plurality of anodes in the approximate location shown in the drawings so as to oxidize the bottom layer of glass at the inlet end as disclosed in co-pending U.S. Pat. No. 4919698, granted 4/24/90 for the sake of avoiding nickel sulfide stones. The preferred location for the cathodes 21 is immediately upstream from the spring zone 23 so that changing the redox condition toward a more reducing condition lowers the solubility limit of the sulfate in the glass so that more sulfate is available for dissociation at the spring zone. The peak temperature attained at the spring zone also reduces the solubility limit of the sulfate in the glass, so the combined effect of raising the temperature at the spring zone and altering the redox condition assures a vigorous gas release and adequate fining.

The following example is set forth to illustrate a particular application of the present invention. The usual solubility limit for soda-lime-silica flat glass from one commercial source is about 0.22% of sulfate, which is the amount that appears in the product glass. To provide sufficient dissociation for refining, the prior art approach required the glass to include about 0.27% $SO_3$ as it entered the fining zone. In other words, dissociation of about 0.05% $SO_3$ yields adequate refining. Expressed another way, it is typical for approximately 25 percent of the sulfate dissolved in the glass to be subsequently lost from the glass in order to effect adequate fining. But to provide that much sulfate at the fining zone, a considerable surplus of sulfate needs to be provided in the batch materials due to losses of sulfate during the initial melting stage. Therefore, batch mixtures have typically been formulated to include enough sulfur source to theoretically yield about 0.5% $SO_3$ in the glass. The resulting emissions attributable to volatilization of the excess sulfates in the prior art approach can be reduced by employing control over solubility in accordance with the present invention rather than providing a surplus of sulfate. In the typical case described above, the ratio of iron in the ferrous state (expressed as FeO) to total iron (expressed as $Fe_2O_3$) of the glass would be approximately 0.25. If the glass is initially melted under similar conditions except with less sulfate, and the redox conditions are subsequently changed to increase the ratio of ferrous to total iron to a amount substantially higher than 0.25, the solubility of the sulfate in the glass can be lowered so that the same 0.05% of SO₃ is dissociated in the fining zone. For example, it has been calculated that raising the ferrous to total iron ratio to about 0.55 would yield an adequate amount of sulfate dissociation from a glass initially formulated to contain only 0.15% SO₃ after initial melting. The benefits of the present invention may be attained with substantially smaller changes in the redox conditions, and an appreciable effect may be expected with a redox change of about twenty percent measured as the increase in the ratio of ferrous to total iron. In the conventional manufacture of soda-lime-silica flat glass, the ferrous to total iron ratio would not normally exceed about 0.30. Therefore, another expression of the incremental change in the redox conditions in the present invention is that the ferrous to total iron ratio is raised to a level of about 0.35 or more in a downstream region from a level less than that in the initial zone of the melting process. Ratios of 0.4 or more and even 0.5 or more are contemplated, and can yield glasses having advantageously high proportions of their iron contents in the ferrous state. Sustained, continuous, commercial production of glass with such high ferrous to total iron ratios is very difficult or impossible by conventional means.

Other variations and modifications as would be apparent to those of skill in the art may be resorted without departing from the scope of the invention as defined by the claims that follow.

We claim:

1. A method of making glass so as to control the final valence state of multivalent ions contained in the glass, comprising:
   melting glass batch materials containing a source of the multivalent ion and a fining agent at an upstream zone in which redox conditions in the melting glass are maintained relatively oxidizing as measured by the ratio of ferrous iron to total iron, whereby the batch material is substantially liquefied while avoiding undue premature dissociation of the fining agent and assuring the presence of sufficient fining agent in the molten glass entering a downstream fining zone to provide adequate fining;
   at a downstream zone introducing a reducing agent uniformly throughout the melt to alter the redox conditions to be more reducing as measured by an increase in the ratio of ferrous iron to total iron of at least twenty percent compared to the ratio in the upstream zone, thereby reducing solubility of the fining agent in the melt to induce dissociation of the fining agent to thereby aid in fining, and thereby controlling the final valence state of the multivalent ions in the glass product by inducing a greater proportion of the multivalent ions to be present in their lower valence state.

2. The method of claim 1 wherein the multivalent ions comprise iron.

3. The method of claim 1 wherein the multivalent colorant ion comprises selenium.

4. The method of claim 1 wherein the reducing agent is introduced into the melt in a gaseous state.

5. The method of claim 1 wherein the reducing agent is introduced into the melt by electrolysis.

6. The method of claim 1 wherein the batch materials being melted include a sulfate source which serves as the principal fining agent.

7. The method of claim 6 wherein the batch materials include sand and the sulfate source is included in an amount of at least 5 parts by weight, expressed as sodium sulfate, for each 1000 parts by weight sand.

8. The method of claim 6 wherein the sulfate concentration of the glass after the redox conditions have been reduced is no greater than 0.20 percent by weight measured as SO₃.

9. The method of claim 6 wherein the temperature of the melt is increased after the reducing agent is introduced, the temperature increase and redox change being together sufficient to reduce solubility of sulfur species in the melt such that at least 0.05 percent SO₃ dissociates and is lost from the melt at the downstream zone.

10. The method of claim 1 wherein the initial ferrous to total iron ratio of the glass in the upstream zone is less than 0.35 and the reducing agent is introduced in the downstream zone in sufficient quantities to increase the ratio to at least 0.35.

11. The method of claim 1 wherein the reducing agent is introduced in sufficient quantities to increase the ferrous to total iron ratio to at least 0.4.

12. The method of claim 1 wherein the melting takes place in a tank type of furnace in which the batch materials are fed onto a pool of molten glass at an inlet end, molten glass is withdrawn at a longitudinally spaced outlet end, and a region of rising molten glass currents is maintained in a spring zone at an intermediate region between the inlet and outlet ends, and the reducing agent is introduced in a bottom current of molten glass flowing toward the spring zone between the inlet end and the spring zone.

13. The method of claim 12 wherein the reducing agent is introduced at a plurality of locations near the bottom of the furnace.

14. The method of claim 6 wherein the temperature of the melt is increased after the reducing agent is introduced, the temperature increase and redox change being together sufficient to reduce solubility of sulfur species in the melt such that at least 25 percent of the sulfate dissolved in the melt entering the downstream zone dissociates and is lost from the melt at the downstream zone.

15. The method of claim 1 wherein the reduction of the redox conditions is sufficient to yield a final glass composition having a ferrous to total iron ratio of at least 0.5.

16. A method of melting and fining glass wherein dissociation of sulfur compounds is an aid to fining the melting glass, comprising:
   melting glass batch materials including sulfur compounds in an amount sufficient to produce a glass having no more than 0.20 percent sulfur measured as SO₃;
   during the initial melting stages maintaining relatively oxidizing conditions as measured by a ratio of ferrous to total iron of no more than 0.3 whereby solubility of sulfur compounds is enhanced;
   after the batch material has been substantially liquefied, altering the redox condition of the liquefied glass to be more reducing as measured by an increase in the ratio of ferrous iron to total iron of at least twenty percent compared to the ratio in the initial melting stages, whereby dissociation of sulfur compounds is enhanced by reduced solubility in the glass.

17. The method of claim 16 wherein the sulfur content of the glass measured as $SO_3$ after melting and fining is no greater than 0.15 percent by weight.

18. The method of claim 16 wherein the altering of the redox condition is carried out prior to the molten glass entering a region of peak temperature.

19. The method of claim 16 wherein the redox condition is altered by introducing a gaseous reducing agent into the liquefied glass.

20. The method of claim 16 wherein the redox condition is altered by electrolysis.

21. The method of claim 16 wherein the batch materials include sand and the sulfur compounds are included in an amount of at least 5 parts by weight, expressed as sodium sulfate, for each 1000 parts by weight sand.

22. The method of claim 16 wherein the alteration of the redox condition is sufficient to increase the ratio of ferrous to total iron to at least 0.35.

23. The method of claim 16 wherein the alteration of the redox condition is sufficient to increase the ferrous to total iron ratio to at least 0.4.

24. The method of claim 16 wherein the alteration of the redox conditions is sufficient to yield a final glass composition having a ferrous to total iron ratio of at least 0.5.

25. The method of claim 16 wherein the melting takes place in a tank type of furnace in which the batch materials are fed onto a pool of molten glass at an inlet end, molten glass is withdrawn at a longitudinally spaced outlet end, and a region of rising molten glass currents is maintained in a spring zone at an intermediate region between the inlet and outlet ends, and the redox condition is altered in a bottom current of molten glass flowing toward the spring zone between the inlet end and the spring zone.

26. The method of claim 25 wherein the alteration of the redox condition is effected by introducing a reducing agent at a plurality of locations near the bottom of the furnace.

* * * * *